Sept. 1, 1959 C. W. LAND 2,902,292
VACUUM OPERATED PASSENGER SAFETY DEVICE FOR VEHICLE DASH
Filed July 15, 1957 2 Sheets-Sheet 1

Charles W. Land
INVENTOR.

BY

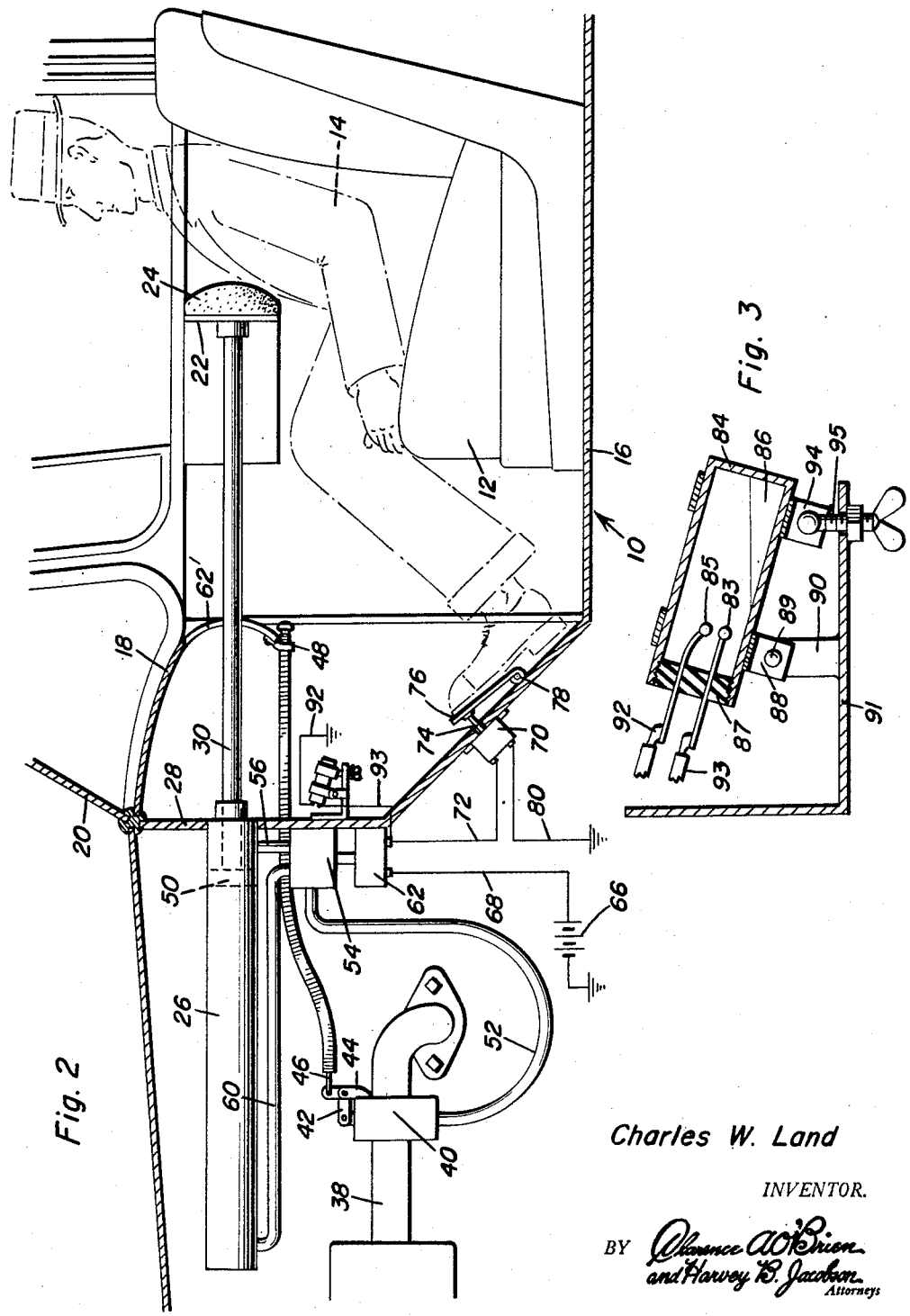

United States Patent Office 2,902,292
Patented Sept. 1, 1959

2,902,292

VACUUM OPERATED PASSENGER SAFETY DEVICE FOR VEHICLE DASH

Charles W. Land, Englewood, Colo.

Application July 15, 1957, Serial No. 671,752

6 Claims. (Cl. 280—150)

This invention relates to a safety device for a motor vehicle, and more particularly to a multipurpose attachment for a motor vehicle, whose principal function is that of a safety device but which has the secondary function of providing a tray support or surface on which to write or do other miscellaneous jobs.

An object of the invention is to provide an attachment for a motor vehicle which will move out by means of engine intake vacuum and which will assume a position of safety in times of impending danger or the moment before an accident.

A further object of the invention is to provide a controllable safety device which is capable of moving from an unobtrusive position within the instrument panel of a motor vehicle to a position close to the chest of a passenger or the motor vehicle operator. It is preferred that the safety device be extremely well padded and that it be operated in response to one or more of a number of conditions. One of these is the depression of a foot pedal on the front floor of the motor vehicle, another is by manual operation of a control member, and another is automatically in response to a rapid deceleration as would be caused by impact.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 2 is a longitudinal sectional view of the motor vehicle of Figure 1 showing the motor vehicle occupied and showing schematically various components of the system;

Figure 3 is a fragmentary sectional view showing an impact-responsive switch which constitutes part of the invention;

Figure 1:
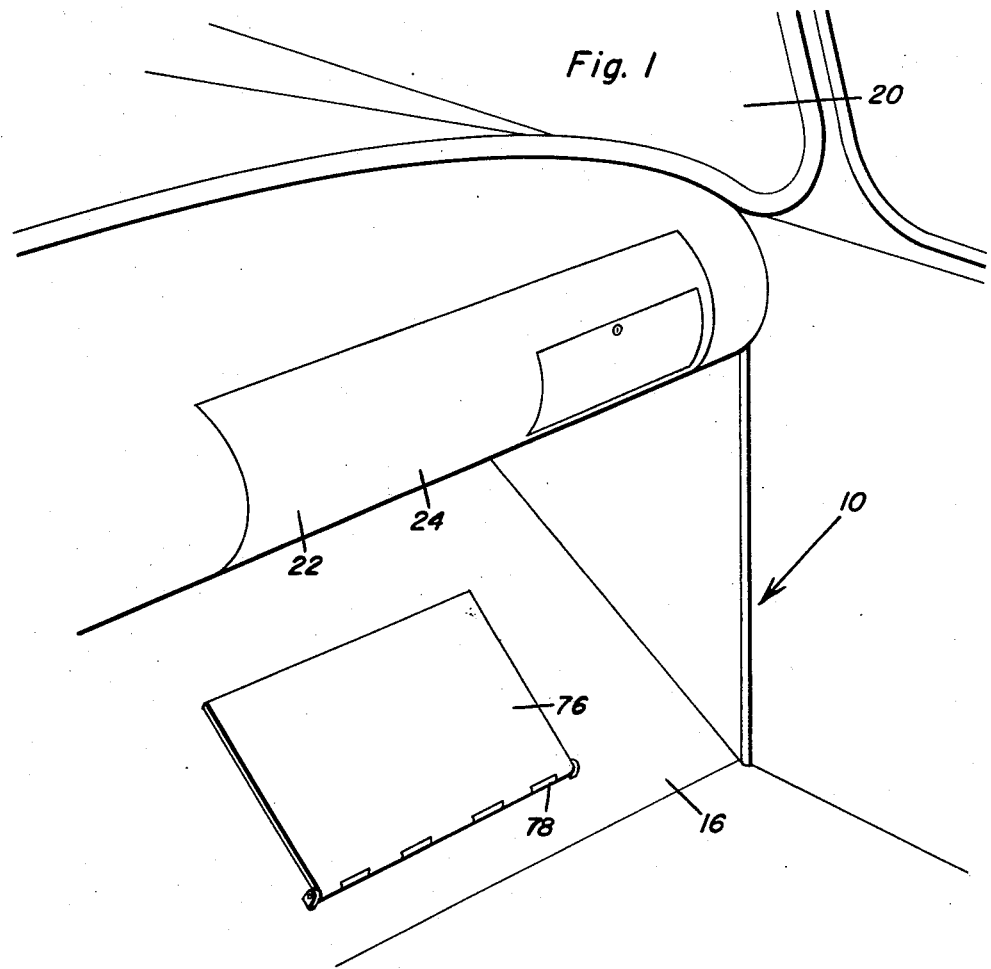
Figure 1 is a fragmentary perspective view of the front of the motor vehicle showing the treadle and stop which constitutes part of the invention.

In the accompanying drawings, there is a motor vehicle 10 which schematically represents any manufacturer's make of motor vehicle. The vehicle has a seat 12 accommodating occupant 14 so that his foot or feet will rest on the floor 16. Instrument panel 18 behind windshield 20 has a stop 22 fitted and contoured therein. The front of the stop 22 has padding 24 adhered to it and preferably fitted with the motif and styling of the interior of the motor vehicle.

One or more air cylinders 26 are secured to the fire wall 28 of the motor vehicle, these having piston rods 30 extending therefrom and passing into the enclosure of the motor vehicle. Stop 22 is fixed to the ends of the piston rods 30. Although air cylinder 26 exemplifies the motor or means for actuating the stop 22 to the position shown in Figure 2 from the position shown in Figure 1, a hydraulic cylinder may be used or an equivalent.

The intake manifold 38 of the motor vehicle engine is fitted with a valve 40, the valve being adapted to be opened and closed by bellcrank 42 and is mounted on a bracket 44 carried by valve 40. Bowden wire 46 is secured to the crank 42 and to the instrument panel 18 by a clamp 48. The purpose of the Bowden wire is to manually operate the valve 40 and enable suction of the intake manifold to draw the piston 50 of cylinder 26 to the position shown in Figure 2. This is accomplished by having hoses 52 extend from valve 40 to a multiple valve 54 and by having a hose 56 extend from the multiple valve to one end of the cylinder 26. Valve 54, when moved to a second position, interconnects the suction from hose 52 to the opposite end of cylinder 26 through hose 60. This returns the piston 50 and withdraws stop 22 into the opening 62' in instrument panel 18.

Valve 54 is mounted on the fire wall 28 and is operated by other means. These other means consist of a double acting solenoid 62 with a mechanical connection with valve 54 and an electrical connection with the source 66 of electrical energy, as the electrical circuit of the motor vehicle. Wire 68 extends from the battery or another hot terminal in the motor vehicle and attaches operatively to one terminal of the solenoid 62. The grounded side of the circuit extends to switch 70 by wire 72, the switch being mounted beneath the floor 16 and having a switch operating arm 74 connected to the bottom surface of treadle 76. This treadle is connected by hinge 78 to the floor 16 and is of ample size (Figure 1) to be operated by the feet or by one foot of the occupant 14 of seat 12. Ground wire 80 extends from switch 70 in order to close the circuit that includes solenoid 62, and this moves valve 54 to a position which intercommunicates hose 52 with hose 56, thereby causing the manifold vacuum to pull the stop 22 to the extended position (Figure 2). When the foot pedal or treadle 76 is released, it is spring returned to the elevated position, causing the solenoid 62 to operate to the return position, as by having a double acting solenoid or by having the armature of the solenoid spring loaded. Thefore, valve 54 will be automatically returned to the position of interconnecting hose 52 with hose 60 and subjecting the inner end of cylinder 26 to manifold vacuum. This withdraws stop 22 to its position within the opening 62' of instrument panel 18.

Additional means for operating solenoid 62 are connected with the motor vehicle. One such means is shown in Figure 3 and consists of a capsule 84 having a pool of mercury 86 in it, this pool adapted to bridge the two contacts 83 and 85 that are passed through the insulating plug 87 at one end of capsule 84. Yoke 88 embraces capsule 84 and is mounted on a pivot 89 that is carried by stand 90 on mounting bracket 91. The mounting bracket is adapted to be fastened to a convenient part of the motor vehicle, as the fire wall 28. Wires 92 and 93 extend from the contacts 85 and 83 and one is connected to ground while the other is connected to the same terminal of the solenoid 62 as the wire 72. The opposite end of the capsule 84 has a band 94 attached to it and is attached to the adjustable stud 95. This stud is adjustably secured as by being threaded in, to the bracket 91. Upon adjustment of stud 95, the angularity of the capsule 84 is altered. Upon impact or extremely rapid deceleration, the pool 86 of mercury will bridge the contacts 83 and 85 and at that instant close the solenoid 62 to actuate valve 54 in such direction as to cause stop 22 to be ejected from instrument panel 18 and to the position shown in Figure 2.

Figure 4:
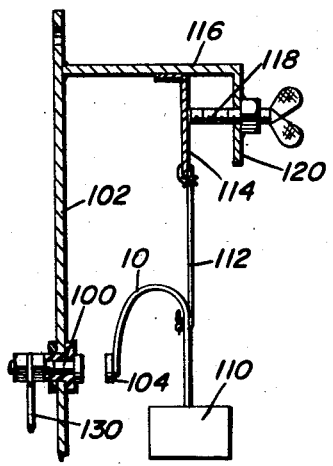
Figure 4 is a fragmentary sectional view showing a modification of the switch in Figure 3.
Figure 5:
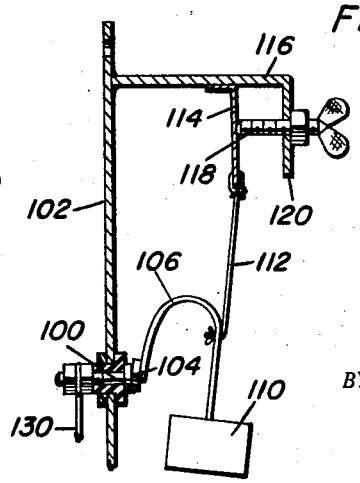
Figure 5 is a fragmentary sectional view showing the switch of Figure 4 in the closed or circuit-making position.

Reference is now made to Figures 4 and 5 where modification of the impact responsive means to operate stop 22 are illustrated. These means consist in a fixed contact 100 which is carried by fire wall 102 together with the movable contact 104 attached at the end of conductive arm 106. Weight 110 is attached to movable arm 106, and there is an electrically conductive cable 112 attached to arm 106 and to hanger 114. This hanger depends from mounting bracket 116 which is attached to fire wall 102 or to a plate which is adapted to be bolted to the fire wall or another convenience surface in the motor vehicle. Setscrew 118 is carried by an angulated part 120 of the bracket 116 and bears against hanger 114 in order to adjust the distance between contact 104 and the stationary contact 100. Wire 130 is connected with the stationary contact 100 and is equivalent in function to the wire 93 or the wire 72.

When the switch of Figure 4 is used, the switch of Figure 3 may be omitted. Various modifications and alterations, combinations and subcombinations may be made herein without departing from the invention as claimed.

What is claimed as new is as follows:

1. In a safety device for motor vehicles which has an intake manifold, a manually controlled valve connected with the intake manifold, a multiple valve, a hose connecting said manually controlled valve with said multiple valve, an air cylinder having a piston and a piston rod, air conductors attached to opposite ends of said air cylinder so that the multiple valve applies vacuum to the cylinder causing the piston and piston rod to be respectively moved inwardly and outwardly, the motor vehicle having an instrument panel that is provided with an opening, a stop fitted in said opening and attached to said piston rod, padding on said stop, and inertia responsive means for actuating said multiple valve to project said stop from said opening in said instrument panel to a position in front of an occupant of the motor vehicle.

2. In a safety device for motor vehicles which has an intake manifold, a valve connected with the intake manifold, a multiple valve, a hose connecting said valve with said multiple valve, an air cylinder having a piston and a piston rod, air conductors attached to opposite ends of said air cylinder so that the multiple valve applies vacuum to the cylinder causing the piston and piston rod to be respectively moved inwardly and outwardly, the motor vehicle having an instrument panel that is provided with an opening, a stop fitted in said opening and attached to said piston rod, and padding on said stop whereby upon opening of said valve and subsequent consequent actuation of said valve, said stop is projected from said opening in said instrument panel to a position in front of an occupant of the motor vehicle, an impact operated switch carried by the motor vehicle, a solenoid, mechanical means connecting said solenoid to said multiple valve to operate said multiple valve, and an electrical circuit in which said impact operated switch is connected and in which said solenoid is connected so that said solenoid is controlled upon impact in order to automatically actuate said multiple valve to a position at which said stop is projected outwardly from the opening in the instrument panel.

3. In a safety device for motor vehicles which has an intake manifold, a valve connected with the intake manifold, a multiple valve, a hose connecting said valve with said multiple valve, an air cylinder having a piston and a piston rod, air conductors attached to opposite ends of said air cylinder so that the multiple valve applies vacuum to the cylinder causing the piston and piston rod to be respectively moved inwardly and outwardly, the motor vehicle having an instrument panel that is provided with an opening, a stop fitted in said opening and attached to said piston rod, and padding on said stop whereby upon opening of said valve and subsequent consequent actuation of said valve, said stop is projected from said opening in said instrument panel to a position in front of an occupant of the motor vehicle, a solenoid, mechanical means operatively connecting said solenoid with said multiple valve, and a switch operatively associated with said solenoid to energize the same in response to actuation of said switch whereby said multiple valve is moved to a position at which said cylinder is subjected to at least a part of the suction of the intake manifold of the motor vehicle.

4. In a safety device for motor vehicles which has an intake manifold, a valve connected with the intake manifold, a multiple valve, a hose connecting said valve with said multiple valve, an air cylinder having a piston and a piston rod, air conductors attached to opposite ends of said air cylinder so that the multiple valve applies vacuum to the cylinder causing the piston and piston rod to be respectively moved inwardly and outwardly, the motor vehicle having an instrument panel that is provided with an opening, a stop fitted in said opening and attached to said piston rod, and padding on said stop whereby upon opening of said valve and subsequent consequent actuation of said valve, said stop is projected from said opening in said instrument panel to a position in front of an occupant of the motor vehicle, a solenoid, mechanical means operatively connecting said solenoid with said multiple valve, and a switch operatively associated with said solenoid to energize the same in response to actuation of said switch whereby said multiple valve is moved to a position at which said cylinder is subjected to at least a part of the suction of the intake manifold of the motor vehicle, a treadle, means hingedly mounting said treadle on the floor of the motor vehicle and adapted to be foot operated, and said treadle operatively connected to said switch.

5. The combination of claim 4 wherein there is an impact operated switch operatively connected for energization of said solenoid.

6. The combination of claim 5 wherein there are means connected with said valve for manually operating the same.

References Cited in the file of this patent

UNITED STATES PATENTS

| 2,705,529 | Bull et al. | Apr. 5, 1955 |
| 2,717,162 | Walters | Sept. 6, 1955 |
| 2,733,109 | Dooley et al. | Jan. 31, 1956 |
| 2,743,942 | Walters | May 1, 1956 |
| 2,806,737 | Maxwell | Sept. 17, 1957 |

FOREIGN PATENTS

| 896,312 | Germany | Nov. 12, 1953 |